No. 635,617. Patented Oct. 24, 1899.
G. W. TUCKER.
CULTIVATOR ATTACHMENT.
(Application filed Jan. 4, 1899.)
(No Model.)
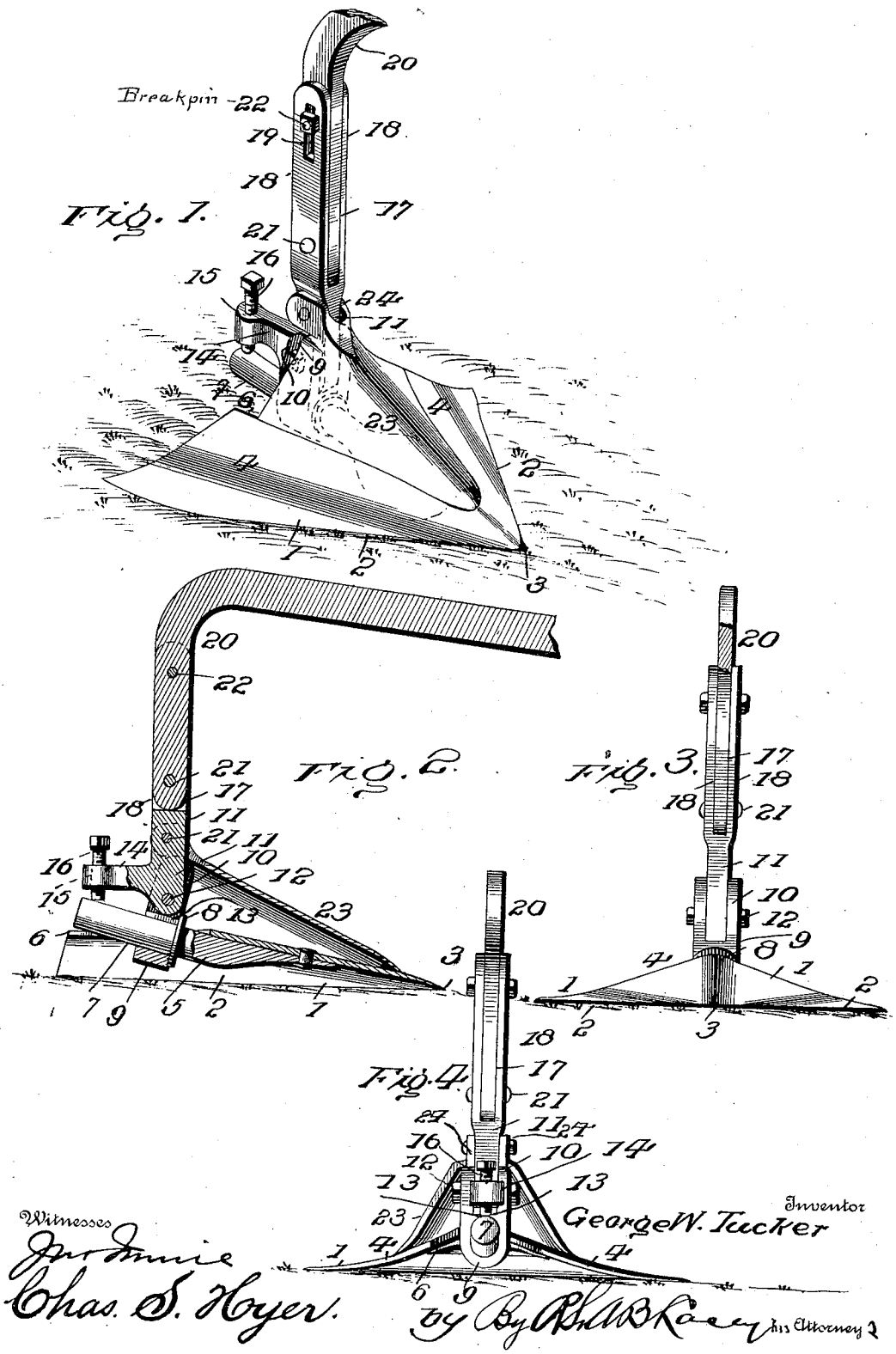
Witnesses
Chas. S. Hyer.
Inventor
George W. Tucker
by By R. A. B. Rosey, his Attorney

UNITED STATES PATENT OFFICE.

GEORGE W. TUCKER, OF GRIDLEY, KANSAS.

CULTIVATOR ATTACHMENT.

SPECIFICATION forming part of Letters Patent No. 635,617, dated October 24, 1899.

Application filed January 4, 1899. Serial No. 701,145. (No model.)

*To all whom it may concern:*

Be it known that I, GEORGE W. TUCKER, a citizen of the United States, residing at Gridley, in the county of Coffey and State of Kansas, have invented certain new and useful Improvements in Cultivator Attachments; and I do hereby declare the following to be a full, clear, and exact description of the invention, such as will enable others skilled in the art to which it appertains to make and use the same.

This invention relates to cultivator attachments; and the purpose of the same is to cut out weeds and also pulverize the soil, being applicable to any cultivator now in use and adjustable to any depth.

The invention consists of the construction and arrangement of parts hereinafter described and claimed.

In the accompanying drawings, Figure 1 is a perspective view of the improved attachment, showing part of a beam in connection therewith. Fig. 2 is a longitudinal vertical section of the same. Fig. 3 is a front elevation. Fig. 4 is a rear elevation.

Referring to the drawings, wherein similar numerals are utilized to indicate corresponding parts in the several views, the numeral 1 designates a shovel, which is arranged in horizontal position, or approximately so, and in accordance with the adjustment of the same and has opposite cutting edges 2, converging from the rear to a front point 3. The opposite portions of the body of the shovel, as at 4, rise regularly in curved lines above the level of the cutting edges 2 and toward the central line of the shovel for the purpose of casting or throwing off the soil or weeds that may come up thereover. To the rear central portion of the shovel a shank 5 is secured and extends therefrom in an upward oblique line and through a slot 6 in the rear upper portion of the said shovel. The greater portion of the rear part of the shank 5 is cylindrical, as at 7, and is provided with a bored circumferential flange 8. The said rear part of the shank is removably fitted in a substantially U-shaped clamp 9, which has the upper arms 10 thereof embracing the lower end of a post 11 and adapted to be held in fixed position by a transversely-extending clamp-bolt 12. The arms 10 of the clamp 9 are provided with inwardly-extending shoulders 13 above the opening, through which the shank passes to serve as a limiting means or stop for the inward extent of the post 11 into said clamp and without interfering with the dimension of the opening for the reception of the shank.

The lower end of the post 11 has a rearwardly-extending arm 14, which is horizontally disposed and has a terminating vertical screw-bearing 15, in which is mounted a screw-bolt 16. The upper portion of the post 11 is bifurcated, as at 17, and the arms 18, formed by the bifurcation, have slots 19 therein. Within the upper bifurcated end of the post 11 the lower end of a cultivator-beam 20 is removably secured by a lower bolt 21 and an upper break pin or bolt 22, which is fitted in the slots 19.

To cover the rear open or slotted part 6 of the shovel 1 and to protect the clamp 9, a shield 23 is mounted on the top central portion of said shovel and is of such form as to regularly continue the lines of the body thereof in an upward direction. The upper central portion of the said shield 23 has opposite ears 24, which are removably secured to the post 11, below the bifurcation 17 thereof, and the purpose of said shield is to prevent the collection of cut weeds or debris at the rear of the attachment and over the clamp, as well as to avoid clogging of the earth at such points and thereby always keep the clamp free and in condition for operation. The addition of this shield facilitates the general operation of the shovel, and it can be quickly removed at any time to operate the clamp, or the bolt 12, controlling the latter, may be reached, as shown by Fig. 1, without detaching said shield.

When cultivating level ground or an approximately level surface, the shovel occupies a horizontal position, with the shield 23 resting squarely thereon along its longitudinal edges. Should it be required to vary the pitch of the shovel to cause it to run shallow or deep, the clamp-bolt 12 is loosened, and upon turning the set-screw 16 to the right the rear end of the shank 5 will be depressed and cause a proportionate rising of the point of the shovel, due to the tilting of the shovel and clamp upon the bolt 12 as a fulcrum.

On the other hand, a backing of the set-screw 11 will permit the point of the shovel to lower and the rear end of the shank 5 to rise, this resulting from having the major part of the shovel in advance of the pivot clamp-screw 12. After the shovel has been adjusted to the required pitch its position is fixed by retightening the pivot clamp-screw 12. Should the ground be rolling or slope slightly, the shovel can be adjusted to conform to the surface by loosening the clamp-screw 12 and turning the shovel upon the shank 5 as a journal within the clamp 9. This angular adjustment brings the shovel parallel with the surface to be treated, and a retightening of the clamp-bolt secures the shovel when adjusted. In slight angular adjustments of the shovel the shield 23 may remain in position, because the slight space formed between the low side of the shovel and the adjacent edge of the shield will present no obstacle to the successful operation of the shovel. When the angular adjustment is great, as for side-hill cultivation, the shield must be omitted or replaced by one of special adaptation. By such adjustment also the depth of penetration may be regulated and the work of the shovel positively governed for surface treatment of the soil or pulverizing purposes.

The proportions and dimensions of the several parts may be varied, as well as the minor details of construction, without in the least departing from the nature or spirit of the invention.

Having thus described the invention, what is claimed as new is—

1. In a cultivator attachment, the combination of a post adapted to be secured to a beam and having a rearwardly-projecting arm, a clamp adjustably connected to the lower portion of said post, a shovel having a shank removably and rotatably engaging said clamp, and a set-bolt in the said arm adapted to engage the shank.

2. In a cultivator attachment, the combination of a post or support adapted to be attached to a plow-beam, and a shovel or analogous device adjustably held by the lower end of said post or support and mounted to turn upon a central longitudinal axis to adapt the side portions of the shovel to the surface condition of the soil, substantially as described.

3. In a cultivator attachment, the combination of a post or support, and a shovel or analogous device adjustably connected to the lower portion of said post or support and mounted to turn upon a transverse and a central longitudinal axis whereby the side portions of the shovel can be adapted to the surface condition of the soil and the point elevated or lowered, substantially as described.

4. In a cultivator attachment, the combination of a post adapted to be secured to a beam and having a rearwardly-projecting arm, a clamp adjustably connected to the lower portion of said post, a shovel having a shank removably and rotatably engaging said clamp, a set-bolt in the said arm adapted to engage the shank, and a shield for removable application to the post and shovel, substantially as specified.

5. In a cultivator attachment, the combination of a post or support adapted to be attached to a plow-beam, a shovel or analogous device adjustably held by the lower end of said post or support and mounted to turn upon a transverse and a longitudinal axis, means for securing the shovel in an adjusted position, and an adjustable and detachable shield on the top of the shovel, substantially as and for the purpose set forth.

In testimony whereof I affix my signature in presence of two witnesses.

GEORGE W. TUCKER.

Witnesses:
T. A. WISEMAN,
T. G. MORRIS.